United States Patent [19]

Cole

[11] Patent Number: 4,781,065

[45] Date of Patent: Nov. 1, 1988

[54] SOLID-STATE ANEMOMETERS AND TEMPERATURE GAUGES

[76] Inventor: Martin T. Cole, 29 Stafford Street, Huntingdale, Victoria, Australia

[21] Appl. No.: 40,592

[22] Filed: Apr. 17, 1987

Related U.S. Application Data

[63] Continuation of Ser. No. 731,674, May 7, 1985, abandoned.

[30] Foreign Application Priority Data

May 9, 1984 [AU] Australia ............................ PG4919

[51] Int. Cl.$^4$ .............................................. G01F 1/68
[52] U.S. Cl. ................................... 73/198; 73/204.18; 73/204.19; 73/204.23; 340/627
[58] Field of Search .................. 73/204, 198; 307/310; 374/178; 340/606, 627–630

[56] References Cited

U.S. PATENT DOCUMENTS

| | | | |
|---|---|---|---|
| 3,268,739 | 8/1966 | Dickson, Jr. .......................... | 307/310 |
| 3,420,104 | 1/1969 | Troemel et al. ................. | 307/310 X |
| 3,624,492 | 11/1971 | Nielsen ........................... | 307/310 X |
| 3,895,286 | 7/1975 | Steckler .......................... | 307/310 X |
| 3,992,940 | 11/1976 | Platzer, Jr. ......................... | 73/204 |
| 4,237,451 | 12/1980 | Hollenbeck ......................... | 340/606 |

FOREIGN PATENT DOCUMENTS

1098077 1/1968 United Kingdom ................. 73/204

Primary Examiner—Herbert Goldstein
Attorney, Agent, or Firm—Learman & McCulloch

[57] ABSTRACT

A solid state temperature and/or anemometer measuring instrument for a fluid medium such as atmosphere the instrument including a pair of semi conductor junction means such as a zener diode one of which is exposed to fluid flow the other being isolated therefrom and providing outputs which are a function of the temperature of the fluid and a measuring device for measuring the respective outputs the differential being an indication of temperature or fluid speed. Such a device has specific application in an optical air pollution monitor to give a continuous indication of fluid flow thus ensuring that the monitor is sampling fresh batches of fluid from a monitored space.

6 Claims, 10 Drawing Sheets

SOLID-STATE ANEMOMETERS AND TEMPERATURE GAUGES

This is a continuation of co-pending application Ser. No. 731,674 filed on May 7, 1985 now abandoned.

The present invention relates to a solid state anemometer or a temperature gauge and in particular to anemometers for use in air-pollution monitoring techniques.

The anemometer is an instrument for measuring the speed of air, whether for meteorological data, ventilation testing or other purposes. The majority of anemometers comprise some form of impeller which rotates due to air movement. The speed of rotation is calibrated to provide a measure of air velocity. Such anemometers consist of mechanical parts and consequently are costly to manufacture, are subject to wear and damage which reduces service life, and are difficult to miniaturize. Furthermore, because energy must be imparted to the impeller to overcome frictional losses, there is a restriction to flow when mounted within pipes.

More recently, solid-state anemometers have been developed for use in ventilation testing. These utilize a pair of thermistor bead elements wired as a compensating circuit (see schematic, FIG. 1). It should be noted that the thermistors are passing current and are consequently dissipating heat, placing each thermistor at a modestly elevated temperature relative to ambient. This is essential so that air flow may cause cooling of the sampling thermistor. One thermistor is exposed to the air flow (sampling element), whilst the other thermistor is protected in still air at ambient temperature (reference element). Ideally, under conditions of zero air speed, the thermistors operate at equal temperatures and thus, the resistance value of each thermistor is equal and the compensating circuit is in balance (zero differential output). When air flows, the sampling thermistor is cooled, which alters its resistance value, causing the circuit to become unbalanced. Accordingly the differential output voltage from the circuit can be calibrated in terms of air flow. The intention of the reference thermistor and the compensating circuit is to allow the anemometer to compensate for variations in ambient temperature. However the accuracy of this compensation has been poor, requiring manual adjustment of the zero setting before each series of air speed measurements is taken. In a hand-held anemometer, this is an inconvenience but not a major problem.

Further disadvantages of thermistor beads have been experienced. The fine connecting wires are subject to damage, fatigue and corrosion, whilst the bead resistance has exhibited a susceptibility to ageing. In addition, thermistor beads are quite expensive and are very difficult to handle during anemometer assembly.

A new application for anemometers has given rise to a new method for measuring air speed, which provides adequate compensation for temperature drift and is compact, robust, inexpensive, simple to manufacture, contains no moving parts, is miniature and provides negligible restriction to air flow.

An optional air-pollution monitoring technique has been adapted for the purpose of detecting the earliest traces of smoke from incipient fires, thereby to reduce the loss of life and property caused by established fires. This is especially applicable to situations where modern synthetic materials may become involved, because of the highly toxic fumes liberated.

It is required that representative samples of the air within each part of the fire detection zone, be passed through the smoke detector, such that the air quality can be continuously monitored. Such monitoring may be achieved by a mechanically-aspirated pipe network or more simply, by coupling to the return-air register of an air-conditioning system.

In either case, any interruption to the air flow through the smoke detector must be detected, lest a dangerous fire remain undetected.

In the pipe network case, the possible restriction to air flow caused by an anemometer is an important consideration, since an aspirator of minimum energy input is necessary, to enable continued operation from modest-capacity standby batteries, in the event of mains failure.

A solid-state anemometer is known utilizing a thermistor compensating circuit to detect a loss of air flow, thence to create an appropriate alarm signal. However such an insitu anemometer must be capable of compensation for wide variations in ambient air temperature, in many of the applications of the smoke detector.

THE DRAWINGS

FIGS. 1, 2 and 3 are graphs of output voltages plotted against temperatures for the known thermistor circuits, respectively, of FIGS. 1a, 2a and 3a;

FIG. 6 is a graph showing a representative sample of temperature-voltage characteristics of numerous zener diodes while

FIG. 7 is a graph of differential output voltage against temperature of the zener diode compensated circuit of FIG. 7a;

DESCRIPTION OF PRIOR ART

Figure 1:
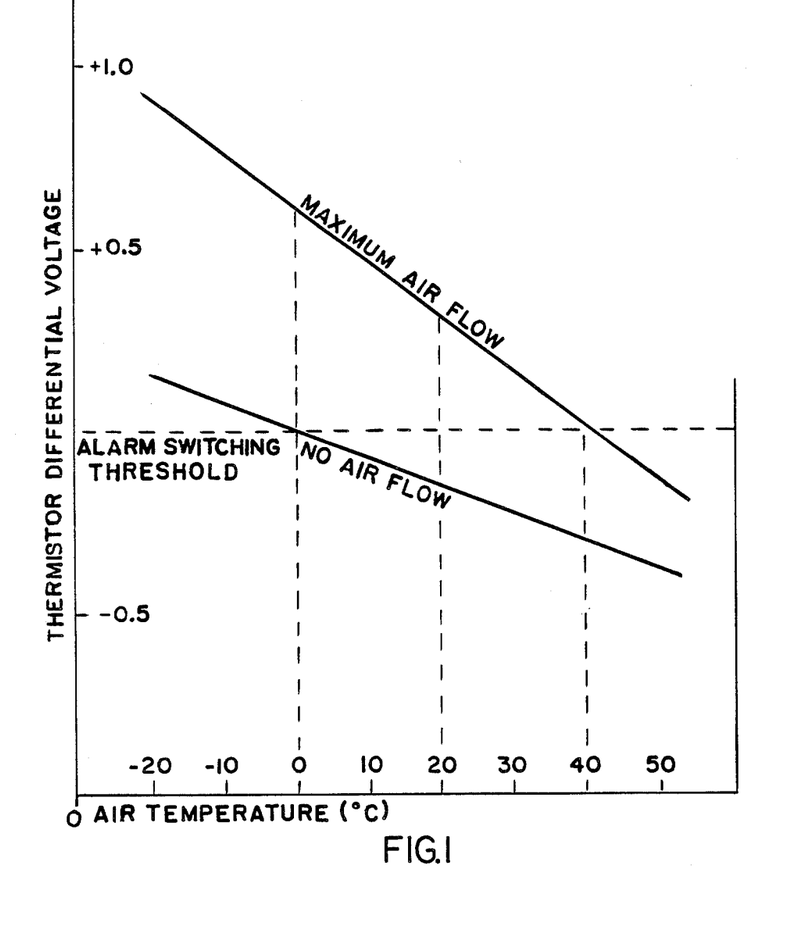
Figure 1A:
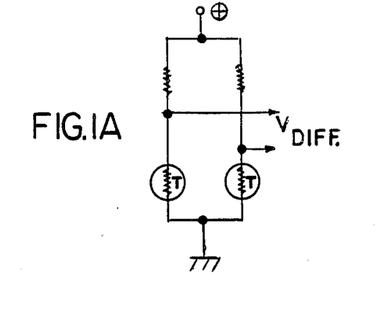
Figure 2:
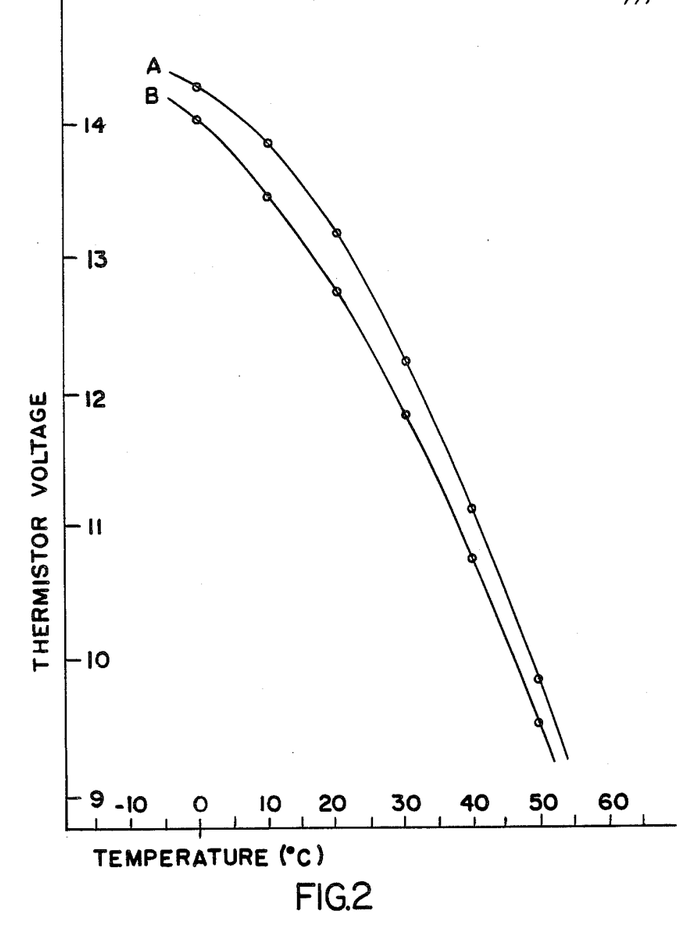
Figure 2A:
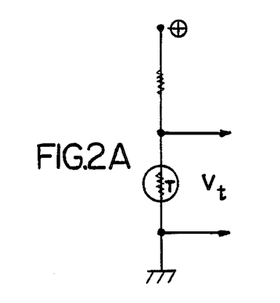
Figure 3:
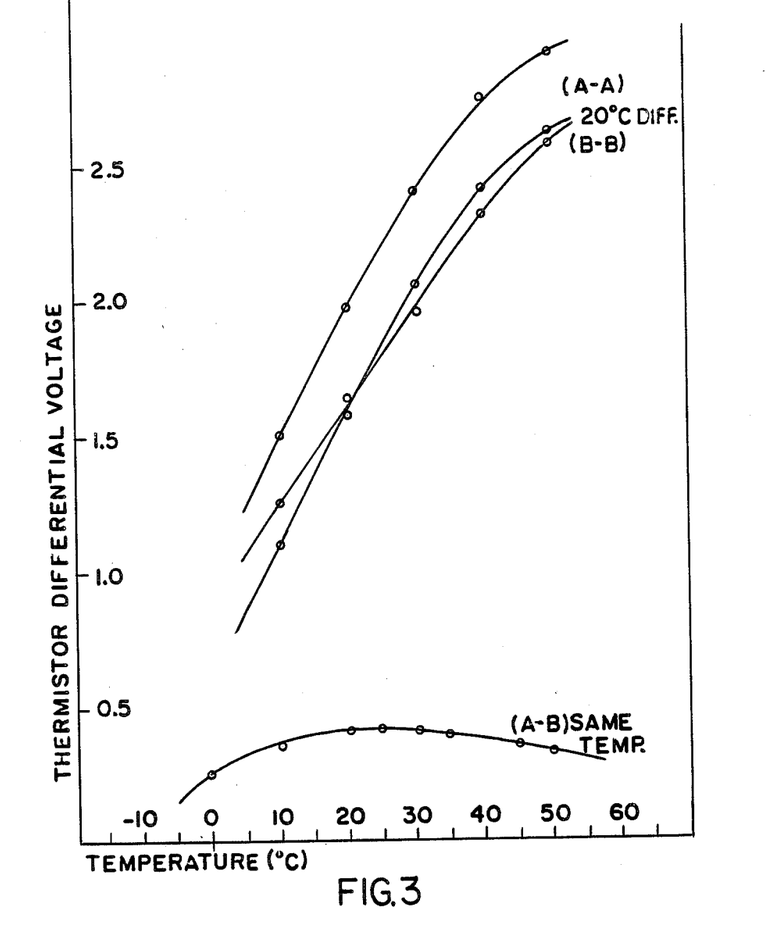
Figure 3A:
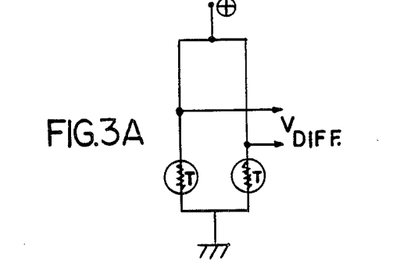

Reference will be made to FIGS. 1 to 3 illustrating known thermistor circuits and graphs of differential output voltages plotted against temperatures.

The graphs of FIG. 1 show the differential output voltage from a compensating circuit, consisting of a typical pair of precision thermistors. Under conditions of zero air flow, the differential output voltage is markedly dependent upon temperature. This dependence becomes yet greater, under conditions of maximum air flow (as determined by the given pipe network and aspirator). The vertical voltage excursion between these two curves, at any given ambient temperature, represents the response of the thermistor anemometer to all air speeds between zero and maximum.

The switching threshold, below which the alarm signal is to be generated, has been placed for convenience and is normally adjustable. This threshold switching function is normally achieved by means of a comparator circuit. At the typical ambient temperature of 20° C. for example, the alarm would be generated should the differential output voltage fall to about one-third of the possible voltage excursion. It should be noted that because of the non-linear response of the thermistor anemometer to air speed, this one-third voltage could represent an air speed of only 10 to 20% of the maximum. Such a span of operation would be acceptable, provided the ambient temperature deviation was small, in the region of 5° to 10° C. (e.g. air-conditioned area).

However, should the ambient temperature *rise* by 20° C. or more, it would become impossible to exceed the alarm threshold and an alarm signal must be generated, irrespective of air speed. Furthermore, should the ambient temperature *fall* by 20° C. or more, it would become impossible to reach the alarm threshold and an alarm signal could not be generated, irrespective of air speed. For practical purposes, the full span of operation of such an anemometer would be rather less than 40° C., rendering it unsuitable for areas which are exposed to seasonal temperature changes. To factory-set the alarm threshold, without knowledge of the product destination, would be largely pointless.

More significantly, the use of dust filters in association with the smoke detectors has led to a requirement for sensitive setting of the alarm threshold, according to the actual flows achieved in the field, such that the partial-blocking of the filter can be detected. It is not sufficient merely to detect a total air flow loss. To detect for example, a 30% loss in flow, accurately across a range of −20° C. to +50° C., requires a substantial jump in the accuracy of temperature compensation.

The reason for the poor performance of the thermistor design can be readily understood by reference to FIG. 2 of the drawings which shows the individual output voltages from each thermistor, versus bead temperature of each thermistor, assuming a supply voltage of 15V DC and a series resistor of 2k Ohm. Curves A and B represent the worst-case tolerance extremities for the precision thermistors used.

FIG. 3 illustrates the differential output voltage of a compensating circuit comprising thermistors A and B. In the case where A and B are maintained at the same temperature, the differential output voltage (A-B) is relatively flat. This represents the zero air flow situation. In the case where two identical thermistors are chosen (A—A) or (B—B), the curve would be a horizontal straight line at zero volts. However if one thermistor is exposed to air flow, such that its temperature is reduced by 20° C. below the other for example, a very steep curve (A-B) results, even when perfectly matched thermistors are used (A—A) or (B—B).

In summary, under conditions of imperfectly matched thermistors, the temperature drift relative to flow signal (differential voltage), at an ambient temperature of 20° C. and high air flow is about 1.6%/° C. The difficult task of perfectly matching the thermistors would afford no improvement.

The reason for this poor performance is a fundamental limitation of the thermistor approach. Namely, it is the inherent non-linearity of the resistance vs. temperature curve. This curve is conveniently expressed in the form:

$$R = A^* \exp(K/(T+273))$$

Where R is the resistance and T is the bead temperature (Celsius). A is a constant understood to lie within the range 0.01293 to 0.03884 and K is a constant understood to lie within the range 4096 to 3681, as determined by the manufacturing process of the particular brand of thermistors chosen.

It can be seen that the dynamic resistance is a function of temperature. Because the two thermistors would operate at differing temperatures (depending upon air speed), they operate at different parts of this curve. Their dynamic resistances are different and consequently it becomes impossible for one to compensate for the other.

Intuitively therefore, any solution seemed to require temperature-sensing elements which had a linear response.

Integrated circuit temperature-sensing elements have been developed, which have a quite linear response. However, these are costly and are comparatively large, which can present difficulties in miniaturization and restriction to air flow. They also have a significant thermal time-constant. Accordingly, an element of low complexity was sought, such as a semi-conductor junction.

Forward-biased silicon diode junctions are known for their essentially linear temperatures characteristic, commonly 2.2 mV/° C. Accordingly they have been used in temperature measurement, although their application to air speed measurement is not previously known. Nevertheless, the forward voltage-drop of a silicon diode is approximately 0.6V, and to dissipate sufficient power to raise the chip temperature, such that adequate sensitivity to air flow would be achieved, would require substantial current flow, in the order of 100mA or more. This was unacceptable because the smoke detector as a whole must be highly energy-efficient, to enable operation from modest-capacity standby batteries, in the event of mains failure. Accordingly this avenue was abandoned.

It is an objective of the present invention to provide a solid state anemometer which is accurate, has low power consumption and is substantially independent of temperature variations over its working range.

A further objective is to provide a solid state temperature measuring instrument.

There is provided in one form of the invention a solid state temperature measuring instrument for a fluid medium such as atmosphere including a zener diode exposed to said fluid medium and exhibiting a voltage output dependent upon temperature, and means for measuring said voltage output as an indication of temperature of said fluid medium.

In another aspect of the invention there is provided a fluid flow meter including a solid state circuit having a pair of semi-conductor junction means, one exposed to a fluid flow the other being isolated from said fluid flow, and means for measuring the respective outputs of said junction means to give an indication of fluid flow.

Conveniently said junction means are independently connected to said measuring means.

There is provided according to the present invention a solid state anemometer including a pair of zener diodes connected in a compensating circuit configuration, one of said diodes adapted to be exposed to a fluid flow the other being isolated from said fluid flow, means for measuring the voltage differential between said diodes, said differential being an indication of fluid flow speed.

The invention will be described in greater detail, referring to FIGS. 4 through 12.

The use of zener diodes in temperature measurement, let alone air speed measurement, is not previously known to the applicant. They are normally operated in reverse-bias and little detail is published about their temperature characteristics. Depending upon the individual zener diode's breakdown voltage, the temperature characteristic is known to change in magnitude and sign.

Figure 4:
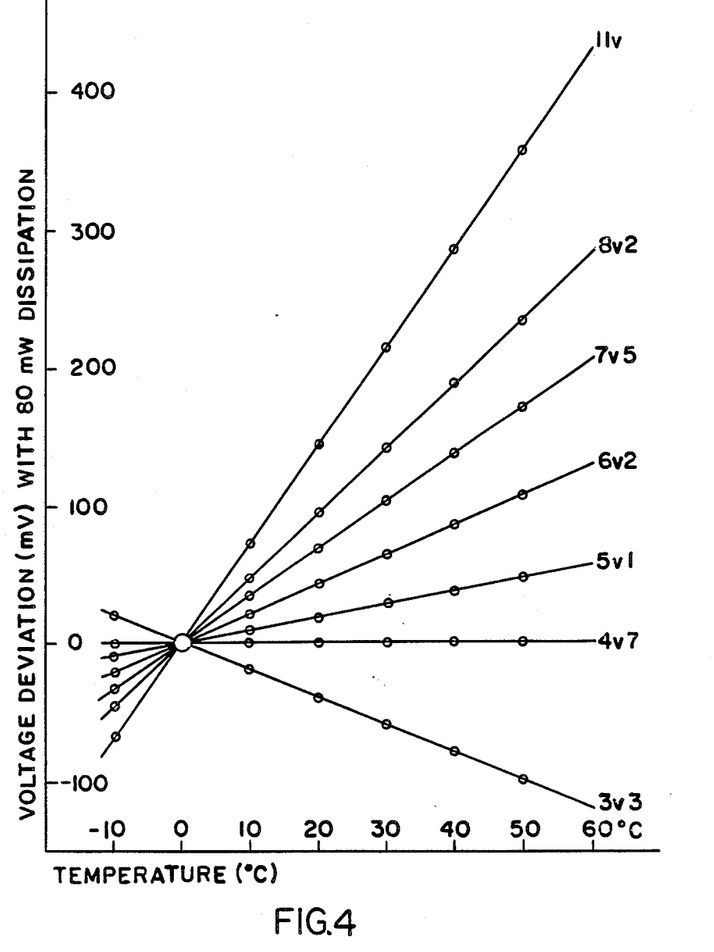
FIG. 4 is a graph of voltage against temperature for various zener diodes having a reverse bias current set to produce a uniform power dissipation of 80 milliwatts (80 mW)

Tests were conducted and the averaged results are graphed in FIG. 4. Each bias current was set to produce a uniform power dissipation (80 mW), to ensure substantially consistent junction temperatures. This demonstrates that the gradient is negative for a 3V device, becoming zero at about 4.7V, and increasingly positive at higher voltages. Most importantly, it can be seen that within the accuracy of measurement (10mV), a *linear* relationship exists.

Figure 5:
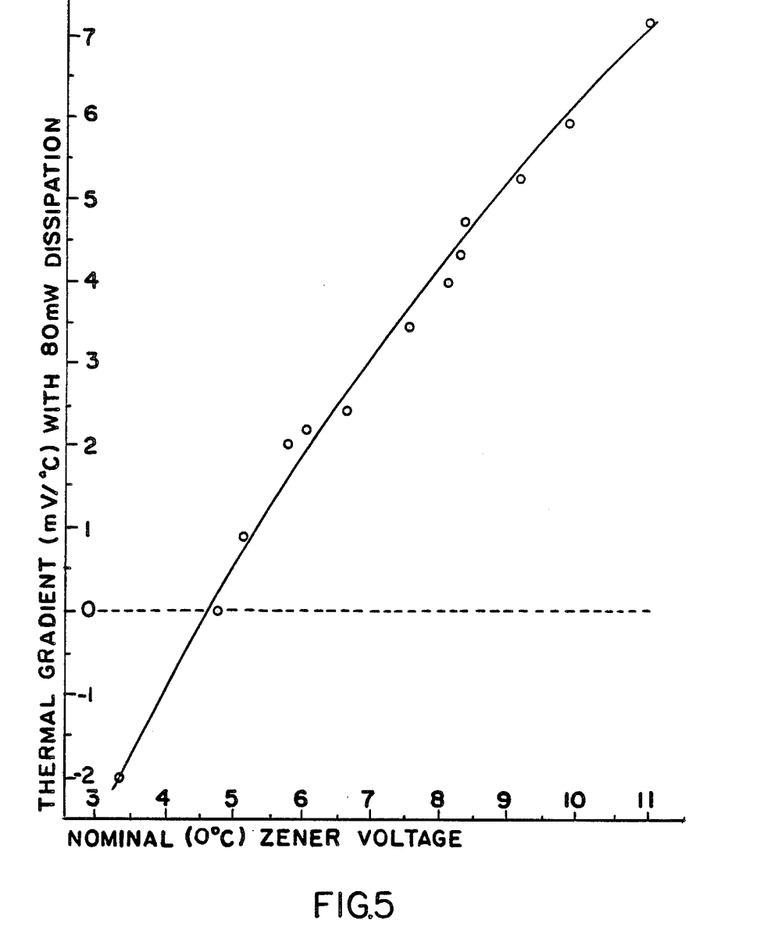
FIG. 5 is a graph useful as a selector guide to choose an appropriate zener diode for a required temperature coefficient.

FIG. 5 becomes a selector guide, whereby the appropriate zener diode operating voltage may be chosen according to a required temperature coefficient. A straight-line approximation to the curve yields a simple relation, the accuracy of which is largely consistent with the spread of results obtained thus far:

$$G = 1.2 \cdot (V_z - 4.6) \text{ or, } V_z = 4.6 + (G/1.2)$$

where G is the thermal gradient (mV/° C.) and $V_z$ is the nominal voltage of the zener diode.

In view of a 15V DC supply constraint, it was decided to select nominally 8.2V zener diodes for more rigorous testing. For any given required power dissipation, the necessary bias current would be nearly 14 times less than for a regular (forward-biased) diode.

Figure 6:
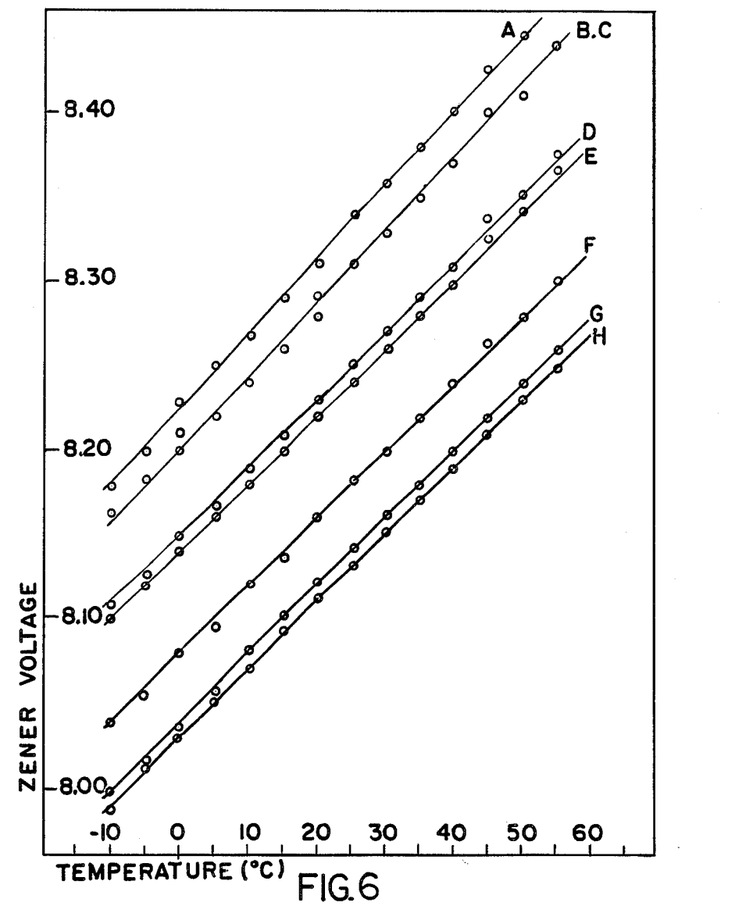
Figure 6A:
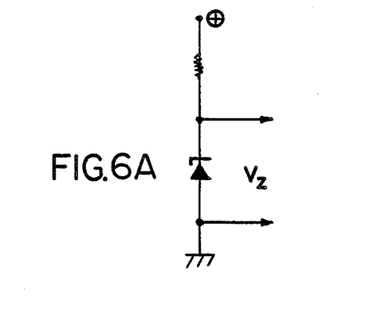
FIG. 6a is a circuit for measuring those characteristics.

FIG. 6 shows a representative sample of numerous zener diodes tested at random. All were nominally 8.2V but two different brands are represented. The linearity and correlation was most promising, with gradients close to 4.0 mV/° C. In all cases a bias current of 10mA was used.

Figure 7:
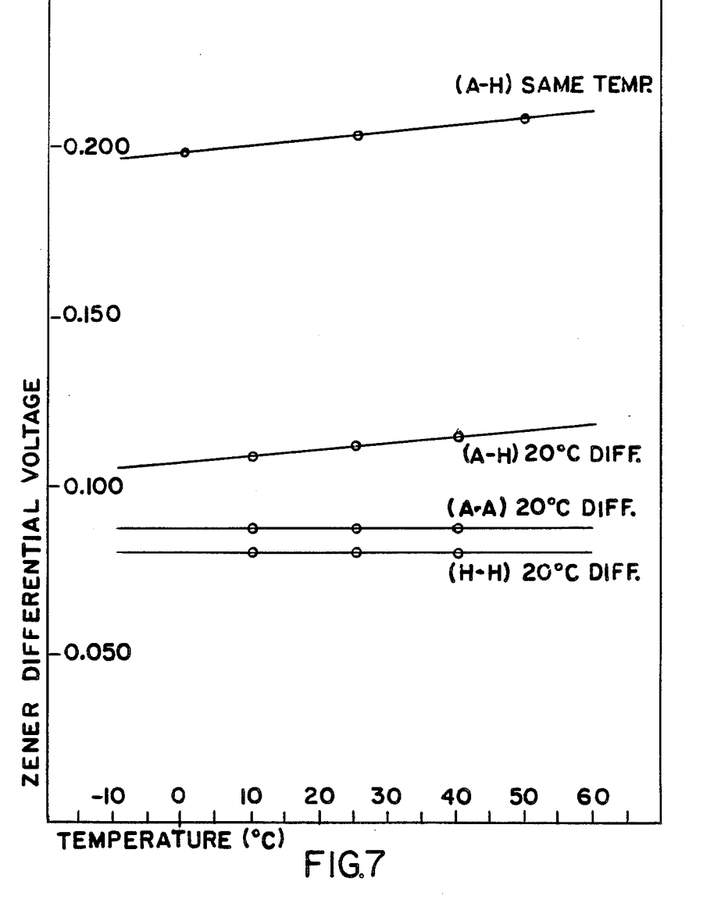
Figure 7A:
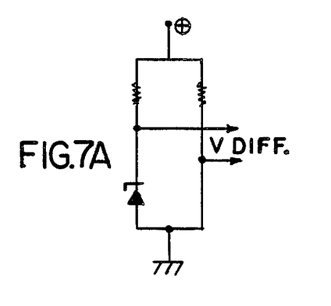

To take worst-case tolerance extremities, devices A and H were selected for use in the circuit configuration shown in FIG. 7(a). FIG. 7 shows that the differential output voltage (A-H) is quite linear, with virtually no change in gradient. For example when a 20° C. temperature differential is applied between junctions (because the sampling element is cooled by air flow), there is virtually no change in the gradient (0.38 mV/° C. becomes 0.37 mV/° C. as shown). In the case of perfectly matched devices (A—A) or (H—H), the differential output becomes completely independent of temperature. Unlike the thermistor situation, matching of zener diodes is a relatively simple process (because of the hitherto unconfirmed linearity of voltage variation as against temperature; and also the rugged construction).

This linearity is therein confirmed by the above test results.

The differential output voltage would normally be presented to a differential amplifier, with conventional DC offset adjustment, thence to an alarm threshold switching device (comparator).

IN SUMMARY

Under conditions of imperfectly matched zener diodes, the temperature drift relative to flow signal (differential voltage), at any ambient temperature in the range of at least 0° to 50° C., and high air flow, is 0.4%/° C. This worst-case condition represents a fourfold improvement upon the thermistor method, however, it has been surprisingly discovered the zener diodes may be relatively simply matched to whatever accuracy may be necessary to achieve any greater improvement sought by the simple process of selecting matched pairs of zener diodes.

Figure 8:
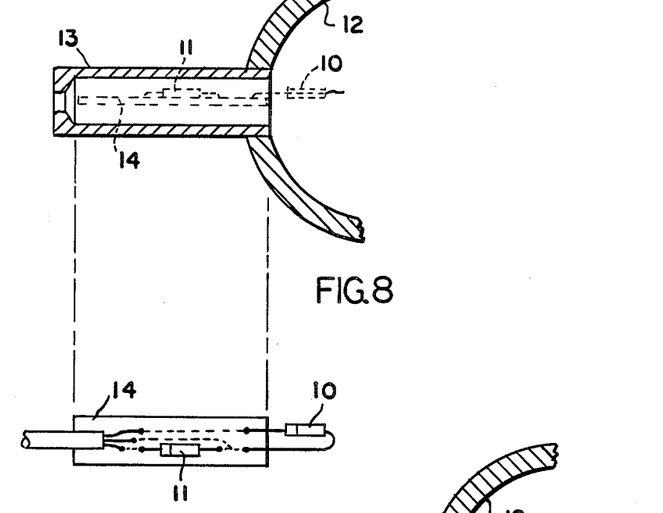
FIGS. 8 and 9 show examples of anemometer construction.
Figure 9:
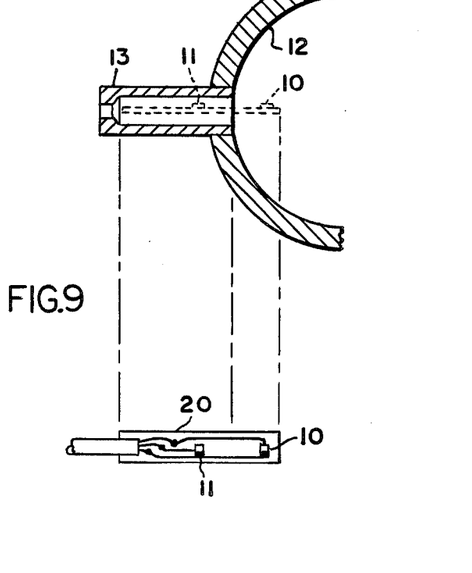

With reference to FIG. 8, construction of the anemometer circuit shown results in a sampling element such as a zener diode 10 being exposed to the air stream, and with a reference element such as a zener diode 11 substantially protected from air currents yet exposed to ambient temperature. In this arrangement, a sealed tube 13 is inserted into the wall of the pipe 12 conducting the air stream into the smoke detector (not shown). The glass hermetically-sealed zener diodes and connecting wires are mechanically and electrically secured to a printed wiring board 14 fixed within the tube 13. Bias resistors and subsequent electronic circuitry are located remotely from the tube 13 in this example. The reference element 11 is protected deep within the tube 13, whilst the sampling element 10 projects into the pipe. Alternatively in FIG. 9 a similar result is achieved using thick-film microcircuit construction where semi-conductor elements, zener diode chips are bonded to a ceramic substrate 20, and conformally coated with a suitable protective material.

In a modified arrangement the zener diodes are operated at different bias currents. In normal operation the sampling element would be cooled by air flow. By contrast, the confined space of the reference element would lead to a rise in temperature (oven effect). Thus it is deemed appropriate to operate the reference element at a lower bias, such that in normal operation, the elements attain a similar junction temperature. Whilst the temperature characteristic is linear within the accuracy of measurement, maintaining a similar junction temperature could only improve their tracking with ambient temperature. More importantly, because the bias current is primarily determined by the sampling element in terms of overall flow sensitivity, reduction in reference bias affords an opportunity to reduce the overall current drain of the anemometer. Experimental results suggest an optimum ratio of 2:1.

Figure 10:
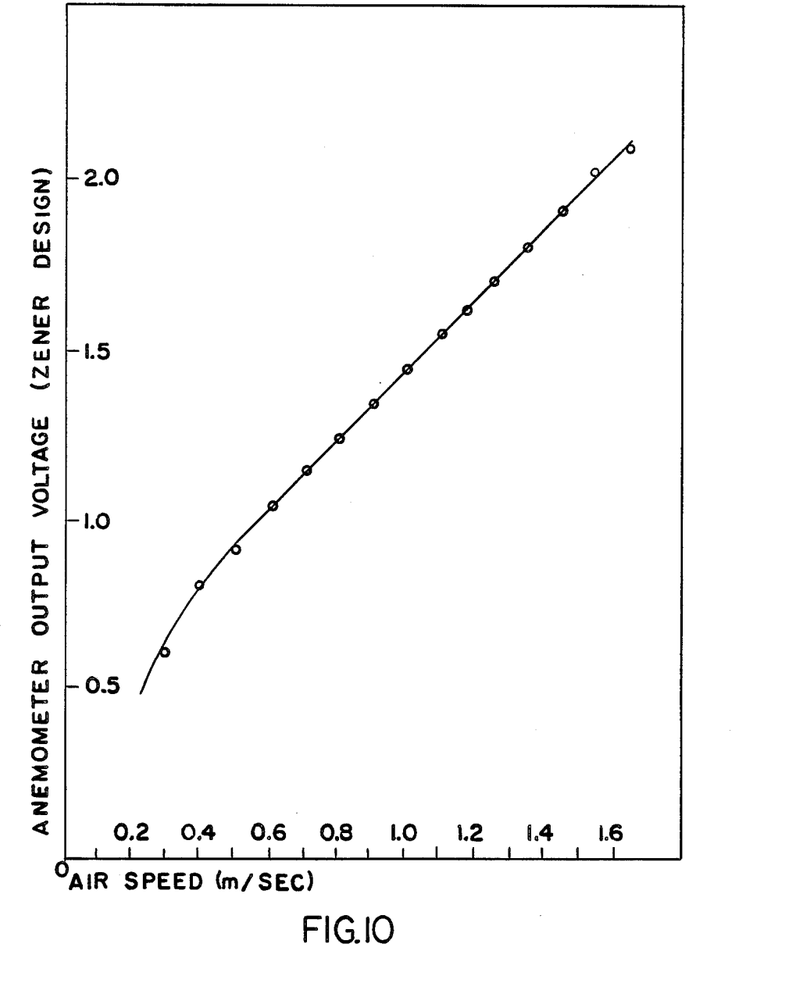
FIG. 10 is a graph of air speed against output voltage for a typical zener diode anemometer.

FIG. 10 shows a typical anemometer calibration curve, for a zener diode design, with bias currents optimised for air speeds in the region of 1m/sec. This curve is quite linear for much of its range, simplifying the adjustment of the subsequent alarm threshold circuitry.

Figure 11:
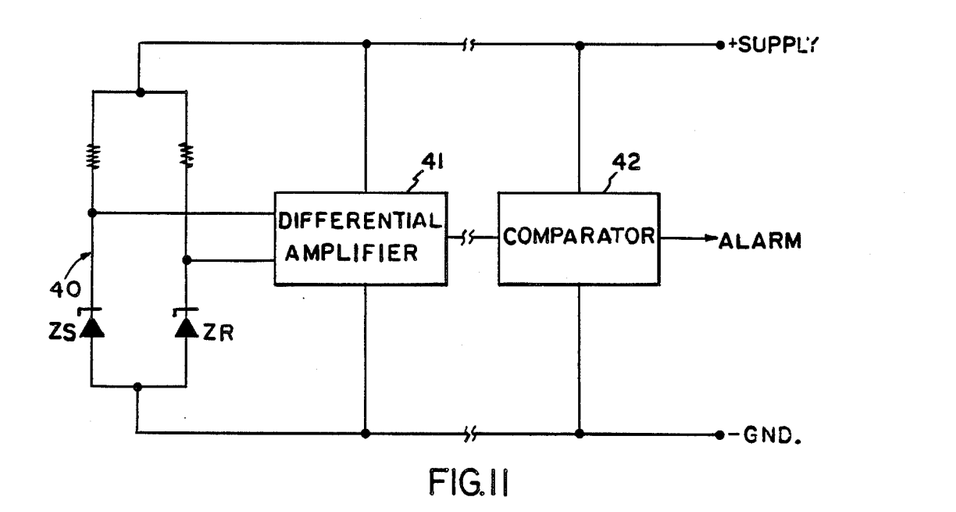
FIG. 11 is a block diagram of a simple arrangement for the flow meter with analog output fed to a threshold alarm means (which may be remotely located)
Figure 12:
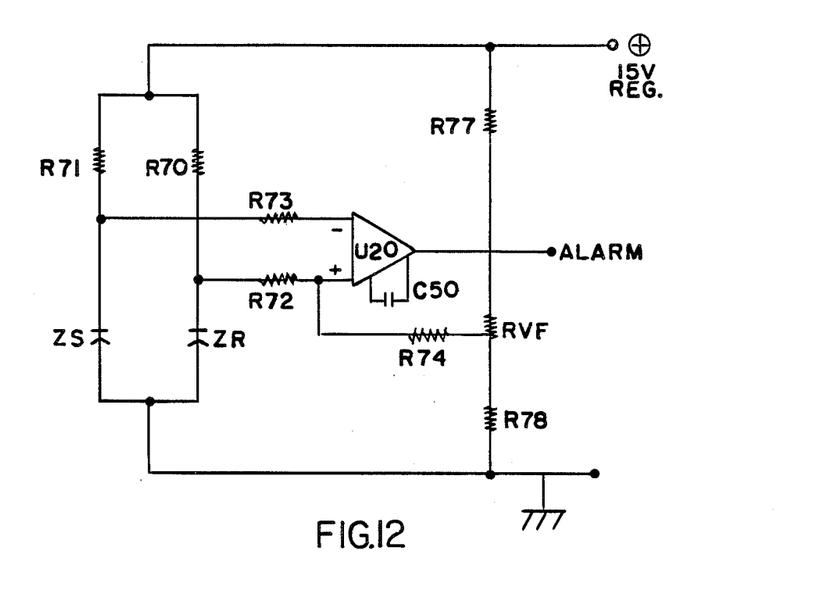
FIG. 12 is a circuit diagram of the zener diode anemometer utilizing a difference amplifier to switch an alarm output on and off.

FIG. 11 is a schematic block diagram of the anemometer comprising compensating circuit 40 including zener diodes ZS and ZR in a resistive circuit as illustrated in FIG. 12. The differential voltage output is applied to a differential amplifier 41. The output of the amplifier 41 is applied to an optional comparator 42. An analog indication of air speed is provided at the output of the differential amplifier 41, whereas the optional comparator 42 provides a set point to generate an alarm which could be used to signal excessive, or inadequate flow.

Naturally the application of this anemometer method is not limited to smoke detectors. It may be extended to many diverse fields of fluid flow measurement, including chemical processing, aviation, meteorology, air-conditioning, automotive, temperature measurement of fluids etc.

I claim:
1. A solid state anemometer comprising:
(A) a differential temperature measurement circuit that includes:
 i. a bridge circuit;
 ii. a source of bias supply connected to opposite corners of said bridge circuit thereby to define two branches in shunt to said bias supply;
 iii. each branch having in series a current limiting resistor and a Zener diode poled so that its P-N junction is back-biased by said supply; and
 iv. means for connecting the conductor between said current limiting resistor and the associated Zener diode of each branch to respective output circuits whereat a differential output voltage can be sensed;
the values of said current limiting resistors and the breakdown voltage-current characteristics of said Zener diodes being substantially identical; the voltage of said bias source being sufficient to cause a reverse breakdown current of substantially equal value to flow through each of said Zener diodes, whereby when the temperature of said two Zener diodes is substantially the same over a considerable range of ambient temperatures the said differential output voltage is substantially negligible; and whereby, as the temperature difference between said Zener diodes increases over said considerable range of ambient temperatures, said differential output voltage varies substantially and correspondingly in linear relation to said temperature difference; wherein a first one of said Zener diodes is exposed to a fluid flow having a thermal influence, and a second one of said Zener diodes is isolated from said fluid flow and said thermal influence, such that heat developed by the reverse breakdown current through each of said Zener diodes is dissipated differently because of different exposures of said Zener diodes to said fluid flow; wherein said Zener diodes are not exposed to any heating influences other than self heating and said fluid flow, if any; and
(B) means for measuring the differential output voltage, if any, existing between said diodes caused by the cooling effect of said fluid flow, if any, said measured differential being an indication of fluid flow speed.

2. The solid state anemometer of claim 1 in which the amount of current which flows through the reverse biased P-N junction of each Zener diode produces heat at each P-N junction of substantially the same quantity.

3. The solid state anemometer of claim 2 wherein the heat produced at each P-N junction is substantially 80 milliwatts.

4. A solid state anemometer as claimed in claim 1 wherein said Zener diodes are exposed to fluid of substantially the same temperature as that of the flowing fluid.

5. An optical air pollution monitor for the purpose of detecting the earliest trace of smoke from incipient fire in an area under surveillance, said monitor having a solid state anemometer which is used as an air flow detector, the anemometer including:
(A) a differential temperature measurement circuit that includes:
 i. a bridge circuit;
 ii. a source of bias supply connected to opposite corners of said bridge circuit thereby to define two branches in shunt to said bias supply;
 iii. each branch having in series a current limiting resistor and a Zener diode poled so that its P-N junction is back-biased by said supply; and
 iv. means for connecting the conductor between said current limiting resistor and the associated Zener diode of each branch to respective output circuits whereat a differential output voltage can be sensed;
the values of said current limiting resistors and the breakdown voltage-current characteristics of said Zener diodes being substantially identical; the voltage of said bias source being sufficient to cause a reverse breakdown current of substantially equal value to flow through each of said Zener diodes, whereby when the temperature of said two Zener diodes is substantially the same over a considerable range of ambient temperatures said differential output voltage is substantially negligible; and whereby, as the temperature difference between said Zener diodes increases over said considerable range of ambient temperatures, said differential output voltage varies substantially and correspondingly in linear relation to said temperature difference; wherein a first one of said Zener diodes is exposed to a fluid flow having a thermal influence in said monitor, said fluid being sourced from the area under surveillance which may be subject to pollution, and a second one of said Zener diodes is isolated from said fluid flow and said thermal influence but being in fluid having substantially the same temperature as the area under surveillance, such that heat developed by the reverse breakdown current through each of said Zener diodes is dissipated differently because of different exposures of said Zener diodes to said fluid flow; wherein said Zener diodes are not exposed to any heating influences other than self heating and said fluid flow, if any; and
(B) means for measuring the differential output voltage, if any, existing between said diodes caused by the cooling effect of said fluid flow, if any, said measured differential being an indication of fluid flow speed and therefore an indication of continuous fluid sampling by said air pollution monitor of the area under surveillance.

6. The air pollution monitor of claim 5 in which each of said Zener diodes include, as circuit elements, a single P-N junction and in which each of said junctions is heated by a reverse bias current of substantially equal value.

* * * * *